E. P. ROTHER.
ROLLER SKATE.
APPLICATION FILED SEPT. 23, 1907.
904,088.
Patented Nov. 17, 1908.
5 SHEETS—SHEET 2.
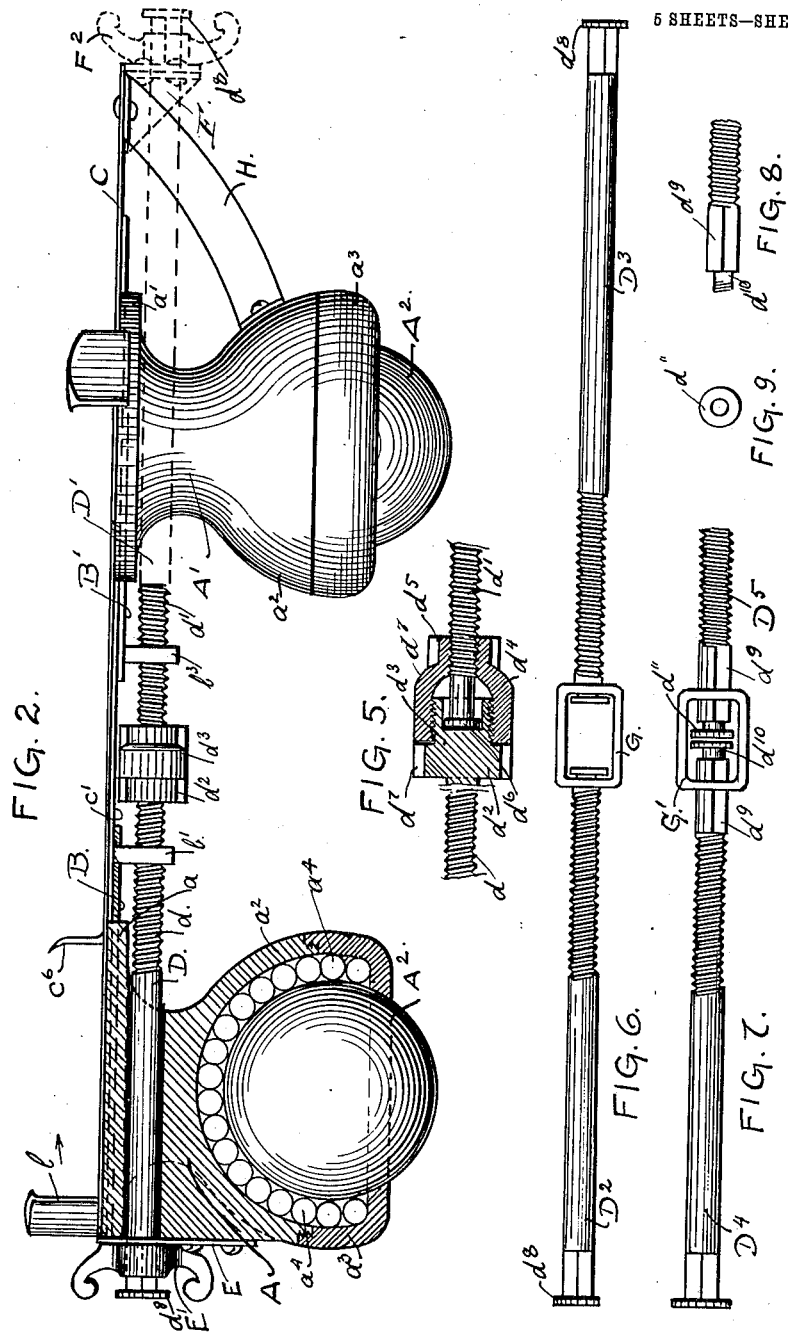
WITNESSES.
H R Weigle
Frank Bush
INVENTOR
Eugene Paul Rother.
By
Atty.

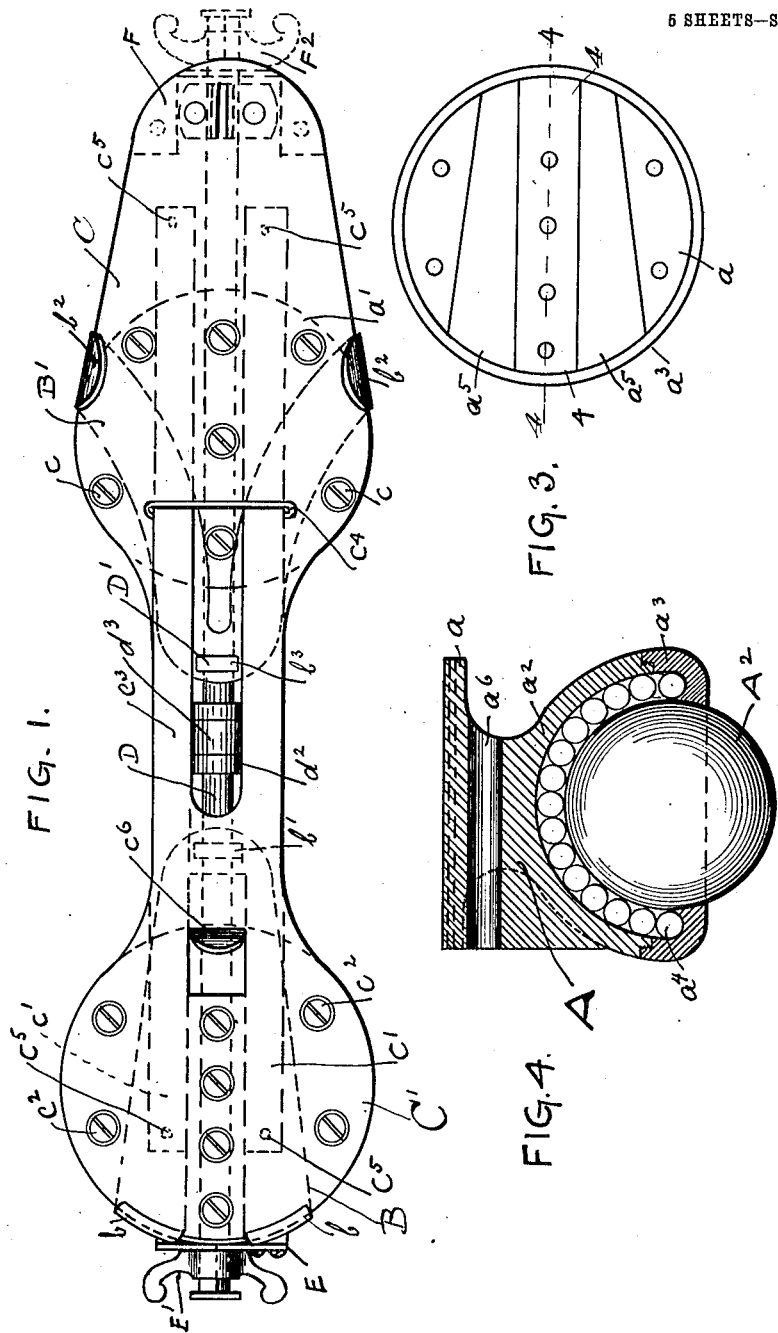

E. P. ROTHER.
ROLLER SKATE.
APPLICATION FILED SEPT. 23, 1907.
904,088.
Patented Nov. 17, 1908.
5 SHEETS—SHEET 3.
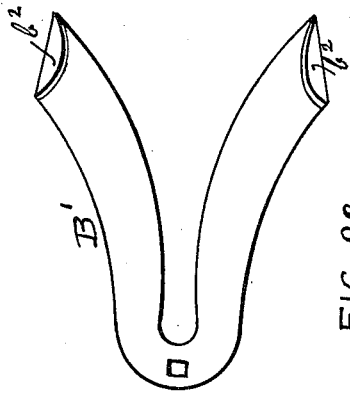
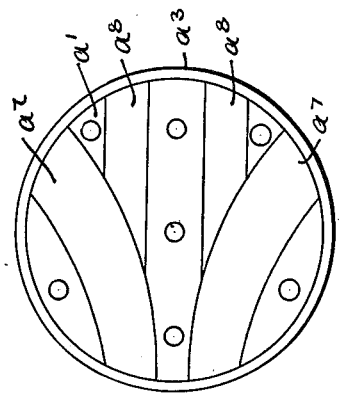
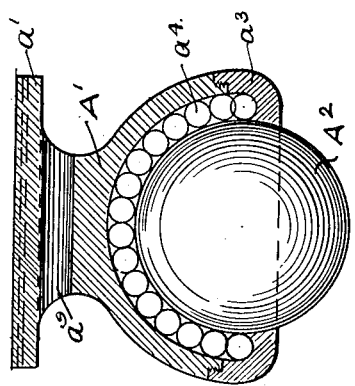
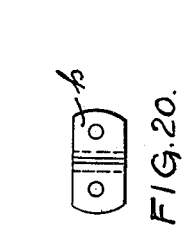
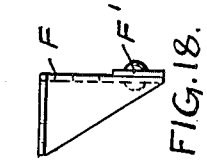
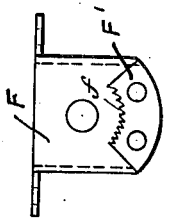
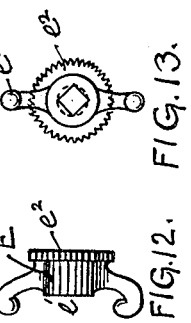
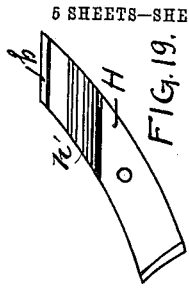
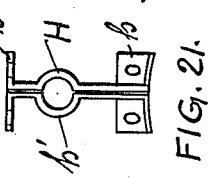
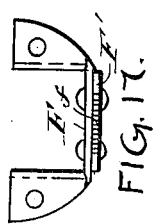
WITNESSES.
H R Weigle
INVENTOR
Eugene Paul Rother.
By
Atty.

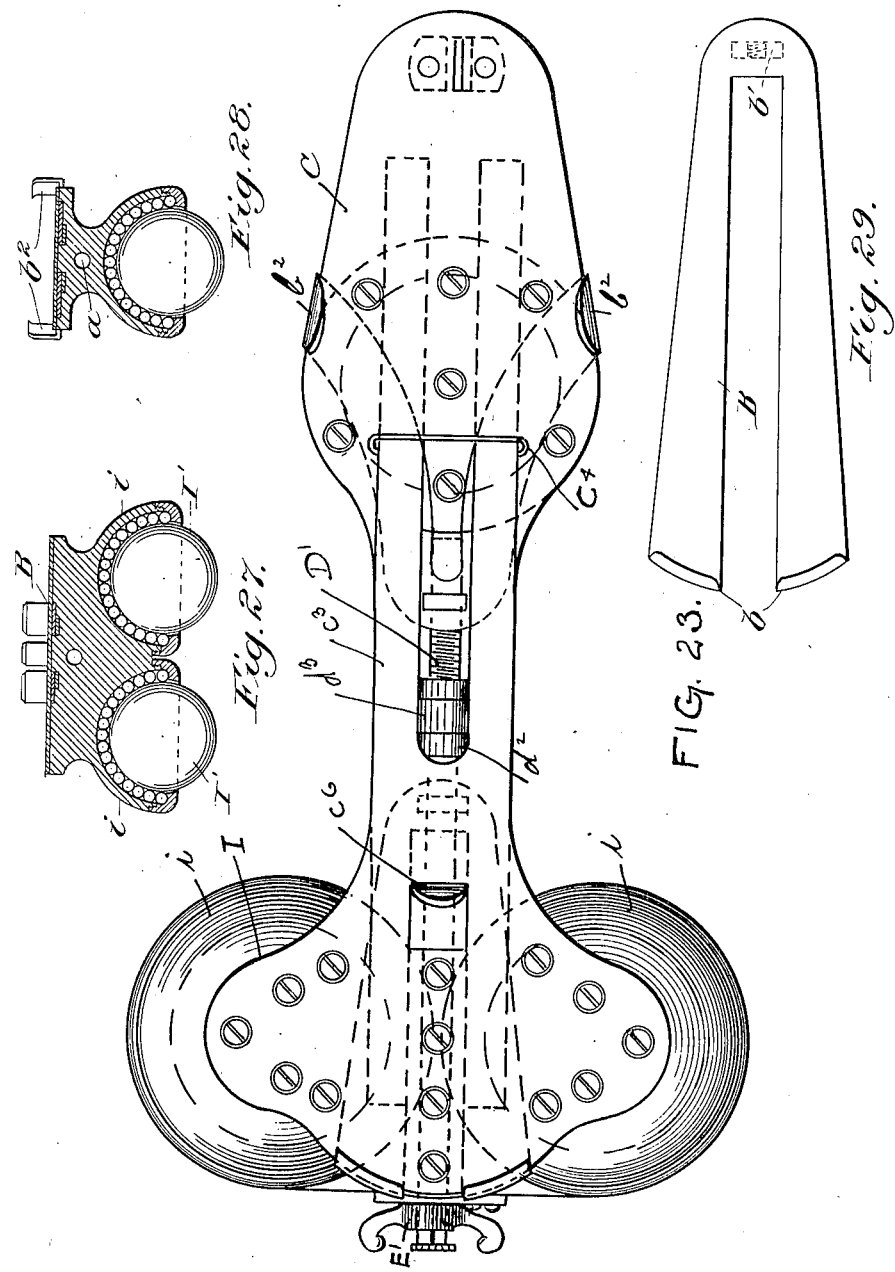

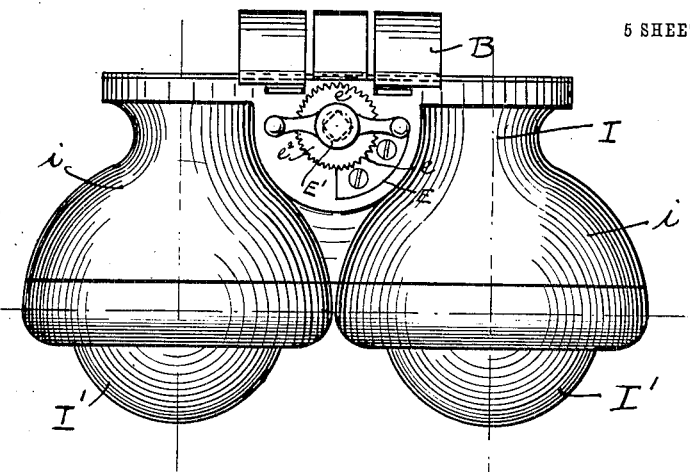
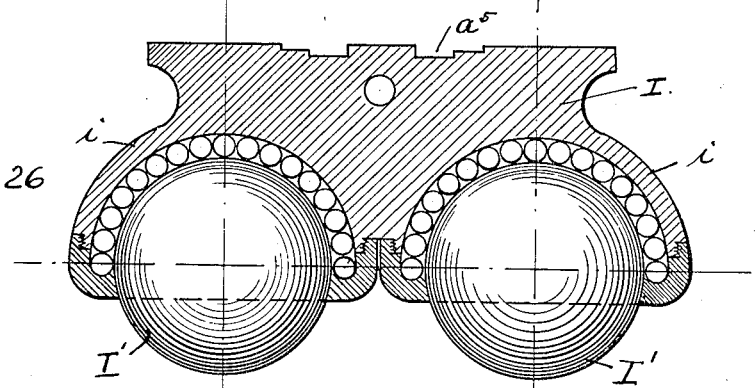
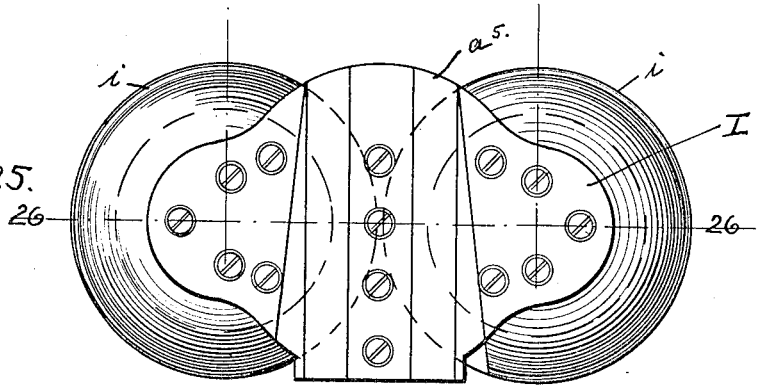

UNITED STATES PATENT OFFICE.

EUGENE PAUL ROTHER, OF CHICAGO, ILLINOIS.

ROLLER-SKATE.

No. 904,088.　　　Specification of Letters Patent.　　　Patented Nov. 17, 1908.

Application filed September 23, 1907. Serial No. 394,143.

*To all whom it may concern:*

Be it known that I, EUGENE PAUL ROTHER, a citizen of the United States, and residing at Chicago, in the county of Cook and State of Illinois, have invented a new and useful Improvement in Roller-Skates, of which the following is a complete specification.

This invention relates to improvements in roller skates and more particularly to a roller skate having spherical rollers.

Heretofore roller skates have usually been provided with cylindrical rollers mounted upon axles and as a consequence the rollers must revolve upon a single axle or axis, instead of being free to move in any direction.

The object of this invention is to provide a roller skate in which the rollers are free to turn in any direction, thereby giving a much greater freedom of movement than has heretofore been possible and adding greatly to the amusement derived by the user.

It is also an object of the invention to provide a skate in which the points of contact between the rollers and the skating surface are reduced to a minimum, thereby greatly lessening the amount of work required in their operation.

It is a further object of the invention to provide a very strong and cheaply constructed skate adapted to be clamped to the foot of the wearer by novel means.

The invention consists of the matters hereinafter described and more fully pointed out and defined in the appended claims.

In the drawings: Figure 1 is a top plan view of a device embodying my invention. Fig. 2 is a view of the same, partly in side elevation and partly in longitudinal section. Fig. 3 is a top plan view of the rear bearing standard. Fig. 4 is a section taken on line 4—4 of Fig. 3 and showing the roller in elevation. Fig. 5 is a fragmentary view of the tary view of one of the clamping bolts shown Figs. 1 and 2. Fig. 6 is a modified form of the coupling and bolts. Fig. 7 is a fragmentary view showing a still further modified form of the same. Fig. 8 is a fragmentary view of one of the clamping bolts shown in Fig. 7. Fig. 9 is an end elevation of the head therefor. Fig. 10 is a top plan view of the front bearing standard. Fig. 11 is a vertical, longitudinal section of same. Fig. 12 is a side elevation of one of the toothed locks. Fig. 13 is an end elevation of the same. Fig. 14 is a face view of the rear locking plate. Fig. 15 is a view of the lock and plate in engagement. Fig. 16 is a front elevation of the front locking plate and supporting bracket therefor. Fig. 17 is a top plan view of the same. Fig. 18 is a side elevation of the same. Fig. 19 is a side elevation of the brace for the sole plate. Fig. 20 is an end view thereof. Fig. 21 is a front view of the same. Fig. 22 is a plan view of the front clamp. Fig. 23 is a top plan view of a modified form of the skate. Fig. 24 is a rear end elevation of the same. Fig. 25 is a top plan view of the rear bearing standard of the device shown in Fig. 23. Fig. 26 is a section taken on line 26—26 of Fig. 25. Fig. 27 is a transverse section of the rear standard. Fig. 28 is a transverse section of the front standard. Fig. 29 is a plan view of the rear clamp.

As shown in said drawings, referring first to Figs. 1 to 22 inclusive, A and A' indicate respectively the rear and the front bearing standards, which are provided at their tops with a head $a$ and $a'$ and at their lower ends with a ball or roller socket $a^2$. Said sockets are screw threaded at their margins and an inverted cap $a^3$ is attached to each and provided with an axial aperture through which the bottom of the spherical roller $A^2$ projects. Said rollers are of less diameter than the sockets, thereby providing ball races about the rollers in which are a plurality of balls $a^4$ affording anti-friction bearings for the rollers.

The head $a$ is provided in its top with a pair of grooves $a^5$ which, as shown more clearly in Fig. 3, increase in width from the front rearwardly. Slidably engaged in said grooves is the rear clamp B, which is substantially V shaped and is provided at its rear ends with upturned lugs $b$ adapted to engage the rear of the shoe heel of the wearer. On the front end of said clamp is a downwardly directed nut $b'$, the bore of which is in axial alinement with a bore $a^6$ in the standard A.

The head $a'$ is provided with grooves $a^7$ which diverge from the rear forwardly, and in which the front clamp B' is slidably engaged. Said front clamp is also substantially V shaped, as shown in Fig. 22, and is provided at its front ends with upturned lugs $b^2$ adapted to engage the side edges of the shoe sole, and on its rear end with a downwardly directed nut $b^3$, the bore of which is in alinement with the bore $a^6$ in the standard A, and with a bore $a^9$ in the standard A′.

A sole plate C is rigidly engaged to the head $a'$ by means of screws $c$ and extends forwardly therefrom, and is provided with a rearward extension $c'$ which is forked at its end and laps over the clamp B in the grooves $a^5$. A heel plate C′ is rigidly engaged to the head $a$ by means of screws $c^2$ and is provided with a forked extension $c^3$ which overlaps the extension $c'$ and the forward end of which extends downwardly through a slot $c^4$ in the plate C and lies in grooves $a^8$ in the top of the head $a'$. Said extensions $c'$ and $c^3$ may be secured to the plates in any preferred manner, but preferably by means of rivets $c^5$. A brace $c^6$ against which the front of the shoe heel engages is provided by turning up a portion from the plate C′. Journaled in said bores $a^6$ and $a^9$ respectively are the clamp adjusting bolts D and D′, the former of which is provided with a right hand thread $d$ near its inner end which engages in the nut $b'$, and the latter of which is provided with a left hand thread $d'$ which engages in the nut $b^3$. Said bolts may be provided with any preferred kind of coupling for their adjacent ends, but as shown in Figs. 1, 2 and 5, the inner end of the bolt D is provided with an enlarged head $d^2$, having a reduced and threaded portion $d^3$ thereon. A sleeve $d^4$ is provided with a large threaded bore in one end adapted to receive the threaded portion $d^3$, and a restricted bore in the other end $d^5$ which is threaded to receive the threaded portion $d'$ of the bolt D′. The inner end of said bolt D′ is provided with a head $d^6$ which may be engaged to the bolt in any suitable manner and prevents the bolt from being withdrawn from the sleeve $d^4$. The threaded connection between the parts $d^2$, $d^4$ and $d'$ affords means for adjusting the clamping bolts longitudinally to increase or decrease their combined lengths, and said head $d^2$ and the end $d^5$ are provided with lugs $d^7$ by means of which they may be engaged with a wrench. By holding the bolts from rotation and turning the sleeve $d^4$ in a direction to retract it from the threaded portion $d^3$ the bolt D′ is forced outwardly and vice versa. As the bolts are forced apart the clamps B and B′ are forced apart and when the proper distance is secured to admit the foot the bolts are both turned in the same direction to secure the clamps to the shoe and in the reverse direction to release the clamps. The outer ends of the bolts are rectangular and provided with enlarged heads $d^8$ secured thereon in any preferred manner.

A locking plate E is rigidly engaged to the rear of the standard A and is provided with a toothed edge $e$, concentric with the bolt D. A lock E′ is slidably engaged on the rectangular end of the bolt D and comprises a sleeve $e'$ having on its inner end a toothed flange $e^2$ adapted to engage with the teeth on the locking plate and hold the bolt from rotation. Said sleeve is provided with wings $e^3$ by means of which it may be moved longitudinally of the bolt to bring the teeth on the flange and plate into and out of engagement and by means of which the bolt may be rotated when the teeth are out of engagement.

A downwardly directed bracket F is engaged to the forward end of the plate C and is provided with an aperture through which the bolt D′ passes. Beneath said aperture and rigidly engaged to said bracket is a locking plate F′ having a toothed edge $f$ concentric with said aperture and in which the lock F², similar to the lock E′, engages.

In Fig. 6 the coupling comprises a link G, having apertures in its ends in which the bolts D² and D³ are journaled so that each may rotate independently of the other.

In the construction shown in Fig. 7 the bolts D⁴ and D⁵ are each provided near their inner ends with a rectangular shank $d^9$ and at the end of which is a cylindrical portion $d^{10}$ of less diameter and which is screw threaded to receive the head $d^{11}$. The link G′ is similar to the link G with the exception that the bolt apertures therein are rectangular, so that when said link is in the position shown in Fig. 7 both bolts must rotate together, but when slipped in either direction to bring the portion $d^{10}$ into the aperture either bolt may be rotated independently of the other.

A brace H extends from the forward end of the plate C downwardly to the standard A′ and acts to support the forward end of the plate. It is constructed of two strips of metal rigidly engaged together and having their ends bent laterally to provide attaching ears $h$ and is provided with a bearing $h'$ for the shaft D′.

In the construction shown in Figs. 23 to 26 inclusive two rollers are provided for the rear end of the skate. For this purpose the standard I is provided with two ball sockets $i$—$i$ in which the rollers I′ are engaged as before described. In other respects the construction is as before described with reference to Figs. 1 to 22.

The operation is as follows: The clamps are adjusted by means of the clamping bolts so as to receive the foot of the wearer and are then set up by means of said bolts to bring them into clamping engagement. The locks at the outer ends of said bolts serve to hold the clamps in adjusted position but are capable of being quickly released when it is desired to operate the clamps.

Obviously with a skate constructed in accordance with my invention the rollers will revolve very freely and with a minimum amount of friction. Obviously also many details of construction may be varied without departing from the principles of my invention.

I claim as my invention:

1. In a device of the class described the combination with a pair of standards, of a plate connecting the same, clamps slidably engaged one on each standard, adjusting bolts journaled one in each standard and extending beyond the standard, means connecting each bolt with the adjacent clamp, a coupling connecting the inner ends of said bolts, and locks one slidably engaged on the outer end of each bolt.

2. In a device of the class described the combination with a heel and a sole plate rigidly connected together, of a standard engaged to each, a ball journaled in and projecting from the lower end of each standard, adjusting bolts journaled, one in each standard and each threaded adjacent its inner end, clamps slidably engaged one on each standard, a nut on each clamp having threaded engagement with the adjacent bolt, a coupling connecting the inner ends of said bolts and permitting independent adjustment of the bolts, and adjustable means on the outer end of each bolt adapted to lock the bolts from rotation.

3. In a device of the class described the combination with a front and a rear standard, of a plate connecting said standards together, clamps slidably engaged one on each standard, a clamp adjusting bolt journaled in the rear standard, a toothed plate engaged on the rear standard adjacent said bolt, a lock slidably engaged on the bolt and adapted to engage said toothed plate, an apertured brace extending from the front standard to the forward end of said connecting plate, a clamp adjusting bolt journaled in said standard and brace, a toothed plate on the forward end of said connecting plate, a lock slidably engaged on said last named adjusting bolt and adapted to engage said last named toothed plate, a coupling connecting the inner ends of said bolts, means connecting each clamp with the adjacent bolt, a ball in each standard and anti-friction bearings for said balls.

4. In a device of the class described the combination with a pair of standards of plates rigidly engaged thereon and connected together, clamps slidably engaged one on each standard, bolts journaled one in each standard and connected to operate said clamps, a toothed lock on each bolt and a spherical roller seated in each standard and projecting downwardly therefrom.

5. In a device of the class described the combination with a pair of standards having grooves in their tops, of means connecting said standards together, clamps slidably engaged one in the grooves of each standard, bolts journaled one in each standard and extending beyond the standard and connected to operate said clamps, a coupling connecting the adjacent ends of said bolts, coacting toothed members at the outer end of each bolt adapted to lock the bolt from rotation, a spherical roller projecting downwardly from each standard and anti-friction bearings therefor.

6. In a device of the class described the combination with a plate of a grooved standard at each end thereof, each having a ball socket therein, an apertured cap having threaded engagement on the margin of each socket, a spherical roller in each socket projecting from the aperture in said cap, a plurality of balls in said socket and cap affording anti-friction bearings for said rollers and a front and a rear clamp slidably engaged in the grooves in said standards.

7. In a device of the class described the combination with a front and a rear standard of a plate connecting said standards together, axially alined threaded shafts journaled one in each of said standards and extending beyond the standard, a coupling at the adjacent ends of said shafts, clamps slidably engaged one on each standard and operatively engaged to said shafts, a toothed locking plate at each end of said plate, a lock slidably engaged on the outer end of each shaft and each adapted to engage one of said locking plates, and a spherical roller projecting from the bottom of each standard.

8. In a device of the class described the combination with a pair of standards having flat, grooved heads thereon, a socket in the bottom of each standard, a spherical roller therein, an apertured cap adapted to engage said socket and secure the roller in place, ball bearings in said socket and cap for said roller, clamps slidably engaged one in the groove in each head and having a nut thereon, oppositely threaded shafts journaled one in and extending beyond each standard and engaged in said nuts, a slidable lock on the outer end of each shaft and a plate connecting said standards.

9. In a device of the class described the combination with a front and a rear standard having alined bores, of a plate connecting said standards, clamps slidably engaged one on each standard, clamp adjusting bolts, one rotatably engaged in each bore and extending beyond the standard and connected with the adjacent clamp, means connecting the inner ends of said bolts and adapted when in one position to lock said bolts together and when in another position to permit independent rotation of said bolts, and a lock on the outer end of each bolt.

10. In a roller skate, the combination with a plate of a front and a rear standard thereon, having alined bores, connected shafts journaled one in each bore, a front clamp and a rear clamp each having threaded engagement with its corresponding shaft, a lock for each shaft and a roller on each standard.

11. In a skate, the combination with a plate of a front and a rear standard thereon having alined bores, shafts, one journaled in the bore of each standard, an adjustable connection for said shafts, clamps one slidably engaged on each standard and each having threaded connection with its corresponding shaft, and means on said standards for engaging the skating surface.

In testimony whereof I have hereunto subscribed my name in the presence of two witnesses.

EUGENE PAUL ROTHER.

Witnesses:
FRANK BUSCH,
B. ZEITZ.